United States Patent
Wang et al.

(10) Patent No.: US 11,407,917 B2
(45) Date of Patent: Aug. 9, 2022

(54) COATING COMPOSITION

(71) Applicants: Dow Global Technologies LLC, Midland, MI (US); Rohm and Haas Company, Collegeville, PA (US)

(72) Inventors: Rui Wang, Shanghai (CN); Hu Li, Shanghai (CN); Weijun Yang, Shanghai (CN); Siyuan Jiang, Shanghai (CN); Hui Chen, Shanghai (CN); Antony K. Van Dyk, Blue Bell, PA (US); Lidaris San Miguel Rivera, Midland, MI (US); Tao Wang, Highton (AU); Tao Wang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/340,862

(22) PCT Filed: Nov. 2, 2016

(86) PCT No.: PCT/CN2016/104323
§ 371 (c)(1),
(2) Date: Apr. 10, 2019

(87) PCT Pub. No.: WO2018/081943
PCT Pub. Date: May 11, 2018

(65) Prior Publication Data
US 2019/0249032 A1 Aug. 15, 2019

(51) Int. Cl.
| | |
|---|---|
| C09D 163/00 | (2006.01) |
| C09D 7/61 | (2018.01) |
| C08F 12/30 | (2006.01) |
| C08F 20/06 | (2006.01) |
| C08F 20/18 | (2006.01) |
| C08F 20/56 | (2006.01) |
| C09D 5/02 | (2006.01) |
| C08G 59/50 | (2006.01) |

(52) U.S. Cl.
CPC ............ *C09D 163/00* (2013.01); *C08F 12/30* (2013.01); *C08F 20/06* (2013.01); *C08F 20/18* (2013.01); *C08F 20/56* (2013.01); *C09D 5/027* (2013.01); *C09D 7/61* (2018.01); *C08G 59/5006* (2013.01)

(58) Field of Classification Search
CPC ........ A61L 2/081; A61L 27/34; A61L 27/505; A61L 27/52; A61L 29/08; A61L 29/14; A61L 29/143; A61L 29/145; A61L 2/10; A61L 2202/18; A61L 2202/24; A61L 2400/10; A61L 2420/02; A61M 25/002; B65B 55/16; C08I 1/286; C08J 3/03; C08K 5/06; C08K 5/1345
USPC ...................................................... 106/186
See application file for complete search history.

(56) References Cited

U.S. PATENT DOCUMENTS

| | | | | |
|---|---|---|---|---|
| 5,643,977 | A * | 7/1997 | Sho .......................... | C09D 4/06 523/408 |
| 6,525,115 | B2 * | 2/2003 | Wang ......................... | C08J 3/07 523/406 |
| 8,907,004 | B2 | 12/2014 | Henderson et al. | |
| 2003/0180511 | A1 * | 9/2003 | Yukinobu ................ | B82Y 30/00 428/209 |
| 2004/0110872 | A1 * | 6/2004 | Hoefer .................... | C09D 163/00 523/400 |
| 2004/0110873 | A1 * | 6/2004 | Nagorny ................ | C09D 163/00 523/402 |
| 2005/0062019 | A1 * | 3/2005 | Yukinobu ................ | H01B 1/22 252/500 |
| 2005/0113553 | A1 * | 5/2005 | Birnbrich ............ | C09D 163/00 528/103 |
| 2012/0301621 | A1 * | 11/2012 | Dombrowski ........ | C08F 220/18 427/386 |
| 2017/0015869 | A1 * | 1/2017 | Karikari ............... | C09G 1/16 |

FOREIGN PATENT DOCUMENTS

| | | |
|---|---|---|
| CN | 101353500 A | 1/2009 |
| CN | 103087613 A | 5/2013 |
| CN | 103980801 A | 8/2014 |
| CN | 104018690 A | 9/2014 |
| CN | 104140743 A | 11/2014 |
| CN | 104870559 A | 8/2015 |
| CN | 105754452 A | 7/2016 |
| EP | 2495281 A1 | 9/2012 |
| WO | WO-0004106 A1 * | 1/2000 .......... C08L 2666/08 |
| WO | 2015094731 A1 | 6/2015 |
| WO | 2016000264 A1 | 1/2016 |
| WO | 2016004575 A1 | 1/2016 |

OTHER PUBLICATIONS

Maincote [Trademark of Rohm and Haas, PR-71 Product data Sheet, 1998] (Year: 1998).*
Hexion [White Paper, 2012] (Year: 2012).*
Pratt and Lambert [Waterborne Epoxy Product Data Sheet, 2013] (Year: 2013).*
Chen et al. [Journal of Applied Polymer Science, vol. 112, 3634-3639 (2009) (Year: 2009).*

(Continued)

*Primary Examiner* — Stefanie J Cohen
(74) *Attorney, Agent, or Firm* — Karl E. Stauss; Cantor Colburn LLP

(57) ABSTRACT

A water-based coating composition containing two parts A and B: (A) a binder component containing a waterborne epoxy dispersion, dispersed inorganic particles, and a polymeric dispersant; and (B) a hardener component, and a ratio of the component (A) and the component (B) is 90:1 to 2:1. The polymeric dispersant contains anti-agglomerating functional groups that are unreactive with oxirane groups of the epoxy dispersion.

7 Claims, No Drawings

(56) References Cited

OTHER PUBLICATIONS

Chinese Office Action for the corresponding Chinese Application No. 201680090213.5; dated Jun. 11, 2021; English translation, 7 pages.

* cited by examiner

COATING COMPOSITION

FIELD

The present invention generally relates to a water-based coating composition that has improved storage stability. Especially, the present invention relates to a water-based coating composition consisting of two parts (Parts A and B). Part A comprises a waterborne epoxy dispersion with dispersed inorganic particles with a polymeric dispersant, while Part B comprises a hardener. The polymeric dispersant comprises anti-agglomerating functional groups that are unreactive with oxirane groups of the epoxy dispersion.

BACKGROUND

Water based coating compositions are used for forming coatings for constructions or buildings because of their reduced environmental impact. Waterborne epoxy binder systems are known as a water based coating composition that forming a coating having good performances such as excellent chemical and corrosion resistances. In the first generation of such waterborne epoxy binder systems, liquid epoxy resins are used as the epoxy binder. The coating compositions of the first generation waterborne epoxy binder systems normally contain external emulsifiers to help dispersion of epoxy binder in the coating compositions.

In the second generation of waterborne epoxy binder systems, solid epoxy resins are used instead of liquid epoxy resins. In a further innovation, a coating composition comprising aqueous dispersions of acrylic polymer particles imbibed with waterborne epoxy resin (acrylic/epoxy hybrid dispersion) was developed and disclosed in US2012/0301621A. In the acrylic/epoxy hybrid dispersion, waterborne epoxy resin is imbibed in the acrylic polymer which has anti-agglomerating functional groups. US2012/0301621A discloses that the concentration of the anti-agglomerating functional groups in the acrylic polymer is sufficient to stabilize the epoxy resin under heat-age conditions.

Normally, epoxy coating compositions are formed from two different components (parts). The two components are mixed just before applying the coating compositions to prevent coagulation of the coating compositions (two-pack system). Normally, the first component (Part A) includes most of the ingredients of a coating composition while the second component (Part B) includes hardener. Part B is added in Part A and mixed sufficiently with Part A just before applying the coating composition on a material.

When inorganic particles such as pigments are added in coating compositions, dispersants are used to disperse (grind) the inorganic particles in the coating compositions. However, when a conventional acrylic polymer dispersant is used in Part A for grinding the inorganic particles, there will be a colloidal stability issue for Part A due to the reaction of acrylic carboxylate groups of the acrylic polymer dispersant with oxirane groups of an epoxy. Therefore, inorganic materials and dispersants have to be added in Part B, but it raises a difficulty of mixing the two parts because the amount of Part B is increased by the addition of inorganic materials and dispersants.

SUMMARY

This invention successfully solves the stability issue when inorganic materials are added in Part A. In one embodiment of the present invention, this invention relates to a coating composition comprising components (A) and (B); wherein component (A) comprises (a) a waterborne epoxy dispersion, (b) a polymeric dispersant and (c) inorganic particles, and component (B) comprises a curing agent, wherein the polymeric dispersant is a polymer comprising an anti-agglomerating functional group.

DETAILED DESCRIPTION

The water-based coating composition of the present invention is formed from the two parts—Part A and Part B. Part A is a binder phase and comprises (a) a waterborne epoxy dispersion, (b) a polymeric dispersant and (c) inorganic particles, in which the inorganic particles are dispersed in Part A by the polymer dispersant which comprises anti-agglomerating functional groups that are unreactive with oxirane groups of the epoxy dispersion. Part B is a hardener phase and comprises a hardener (curing agent).

(A)-(a) Waterborne Epoxy Dispersion

Waterborne epoxy is water-based epoxy and is dispersed/emulsified in water. In the application, waterborne epoxy dispersion is also called as an aqueous epoxy. Examples of waterborne epoxy include, but are not limited to, diglycidyl ether of bisphenol A, diglycidyl ether of bisphenol F, 1,4-butanediol diglycidyl ether, 1,6-hexanediol diglycidyl ether, diglycidyl ester of phthalic acid, 1,4-cyclohexanedmethanol diglycidyl ether, 1,3-cyclohexanedmethanol diglycidyl ether, diglycidyl ester of hexahydrophthalic acid and novolac resins. Two or more waterborne epoxy can be used as a mixture. This waterborne epoxy is mixed in water and forms a dispersion. A commercially available aqueous epoxy dispersion is OUDRASPERSE™ WB-6001 provided by Olin Corporation.

Waterborne epoxy could also be imbibed into acrylic polymer particles to form a waterborne dispersion with multiphase polymer particles. The imbibed waterborne epoxy is described in US2012/0301621A. A commercially available aqueous epoxy dispersion imbibed with acrylic polymer particles is MAINCOTE™ AEH-20 provided by DOW Chemical.

The amount of waterborne epoxy dispersion is from 10% to 75% by weight based on the total dry weight of Part A. The amount of the waterborne epoxy dispersion is preferably 15% or more, more preferably 20% or more, by weight based on the total dry weight of Part A. The amount of the waterborne dispersion is preferably 70% or less, more preferably 60% or less, by weight based on the total dry weight of Part A.

(A)-(b) Polymeric Dispersant

Polymeric dispersant is a polymer which has an anti-agglomerating functional group. The anti-agglomerating functional group refers to a hydrophilic group that is sufficiently unreactive with oxirane groups. Normally, such polymer is formed by polymerization of a monomer composition comprising a monomer having an anti-agglomerating functional group, although it would also be possible to synthesize such polymers by graft polymerization.

In certain embodiments of the present invention, the polymeric dispersant is formed by polymerization of a monomer composition comprising: i) a monomer having an anti-agglomerating functional group, ii) an α,β-ethylenically unsaturated carboxylic acid monomer and iii) an α,β-ethylenically unsaturated nonionic monomer.

Examples of the monomer having anti-agglomerating functional group include, but are not limited to, acrylamide, phosphoethyl methacrylate, sodium styrene sulfonate and acrylamide-methyl-propane sulfonate. The corresponding anti-agglomerating functional groups formed from these monomers are illustrated below:

| Anti-agglomerating monomer | Anti-agglomerating functional group |
|---|---|
| Acrylamide | —C(=O)NH$_2$ |
| Phosphoethylmethacrylate | —C(CH$_3$)(C(=O)O-CH$_2$CH$_2$-O-P(=O)(OH)$_2$) |
| Sodium p-styrene sulfonate | —CH(C$_6$H$_4$-SO$_3^-$Na$^+$) |
| Acrylamido-methyl-propane sulfonate | —C(=O)NH-C(CH$_3$)$_2$-CH$_2$-SO$_3$H |

The dotted lines refer to the points of attachment of the anti-agglomerating functional monomer to the polymer. The amount of the monomer containing anti-agglomerating functional group is preferably 5% or more, more preferably 10% or more, and the most preferably 15% or more, by weight based on the dry weight of the polymeric dispersant. The amount of the monomer containing anti-agglomerating functional group is 80% or less, more preferably 75% or less, and the most preferably 70% or less, by weight based on the dry weight of the polymeric dispersant.

Examples of suitable α,β-ethylenically unsaturated carboxylic acid monomers include, but are not limited to, monobasic acids, such as acrylic, methacrylic, crotonic, and acyloxypropionic acids; and dibasic acid monomers, such as maleic, fumaric, and itaconic acids. The amount of α,β-ethylenically unsaturated carboxylic acid monomer is preferably 0% or more, more preferably 0.1% or more, the most preferably 1% or more, by weight based on the dry weight of the polymeric dispersant. At the same time, the amount of α,β-ethylenically unsaturated carboxylic acid monomer is preferably 10% or less, more preferably 8% or less, and the most preferably 5% or less, by weight based on the dry weight of the polymeric dispersant.

Examples of suitable α,β-ethylenically unsaturated nonionic monomers include, but are not limited to, methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl (meth)acrylate and hydroxypropyl (meth) acrylate; methacrylonitrile; ethacrylonitrile; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride. Preferred examples are butyl acrylate, butyl methacrylate, methyl methacrylate, 2-hydroxybutyl acrylate, 2-hydroxyethyl methacrylate, 2-hydroxypropyl (meth)acrylate, styrene and the mixtures thereof. The amount of the α,β-ethylenically unsaturated nonionic monomer is preferably 10% or more, more preferably 17% or more, the most preferably 30% or more, by weight based on the dry weight of the polymeric dispersant. The amount of the α,β-ethylenically unsaturated nonionic monomer is preferably 95% or less, more preferably 90% or less, and the most preferably 85% or less, by weight based on the dry weight of the polymeric dispersant.

The method for forming the polymeric dispersant depends on the kind of monomers which are used to form the polymer dispersant and is understand by those in the art, but it includes solution polymerization and emulsion polymerization.

Preferably, the polymeric dispersant has a weight average molecular weight of from 300 to 50,000 Daltons. More preferably, the weight average molecular weight is from 500 to 40,000 Daltons.

The amount of the polymeric dispersant is from 0.01% to 5% based on the total dry weight of Part A. The amount of the polymeric dispersant is preferably 0.015% or more, more preferably 0.02% or more, by weight based on the total dry weight of Part A. The amount of the polymeric dispersant is preferably 4% or less, more preferably 3% or less, based on the total dry weight of Part A.

(A)-(c) Inorganic Particles

The Part A comprises inorganic particles which are dispersed in Part A by the polymeric dispersant disclosed above.

These inorganic particles may contain pigments, extenders, and fillers. Examples of the inorganic particles include, but are not limited to, metal oxides such as titanium oxide, aluminum oxide, zinc oxide, silicon oxide and iron oxide, metal phosphate such as zinc phosphate and aluminum phosphate, barium sulfate, metal carbonate such as calcium carbonate, carbon black, talc, clay, feldspar, and lime.

Extenders are particulate inorganic materials having a refractive index (RI) of less than or equal to 1.8 and greater than 1.3. Examples of extenders include, but are limited to, calcium carbonate, clay, calcium sulfate, aluminosilicates, silicates, zeolites, mica, diatomaceous earth, solid or hollow glass and ceramic beads.

The amount of the inorganic particle is from 20% to 85% based on the total dry weight of Part A. The amount of the inorganic particle is preferably 25% or more, more preferably 30% or more, by weight based on the dry weight of Part A. The amount of the inorganic particle is preferably 80% or less, more preferably 75% or less, by weight based on the total dry weight of Part A.

(A)-(d) Other Ingredients

Part A can optionally include other ingredients such as water, wetting agent, defoamer, adhesion promoter, solvent and thickener. Examples of wetting agent include, but are not limited to, Tego Twin 4100 wetting agent, TRITON™ CF-10 surfactant and ECOSURF™ LF-45 surfactant. Examples of defoamer include, but are not limited to, Tego 902W defoamer, Tego 1488 deformer, BYK-024 deformer and BYK-019 deformer. Examples of adhesion promoter include, but are not limited to, DOW CORNING™ Z-6040 silane and DOW CORNING™ Z-6011 silane. Examples of solvent include, but are not limited to, DOWANOL DPnB glycol ether, DOWANOL PM propylene glycol methyl ether, and Texanol ester alcohol. Examples of thickener include, but are not limited to, PRIMAL™ RM-8W acrylic binder, PRIMAL™ RM-12W rheology modifier and Bentone LT additive.

Part A can be formulated using a bench top overhead mixer. Part A can be made by grinding the pigments and extenders first with the polymeric dispersant under high speed dispersing. In the let-down stage, the epoxy dispersion and other ingredients are added to the pigment grind under low speed stirring.

(B) Hardener Phase

Part B is a hardener phase and is mixed with Part A just before applying a coating composition. Part B includes hardeners (i.e., curing agents) to cure the coating composition. Examples of such hardeners include, but are not limited to, diethylenetriamine, triethylenetetramine, tetraethylenepentamine, 2,2,4-trimethylhexamethylenediamine, 2,4,4-trimethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexylpropane, 2,2-bis(4-aminocyclohexyl)propane, 3,3'-dimethyl-4,4'-diaminodicyclohexylmethane, 3-amino-1-cyclohexane-amino-propane, 1,3- and 1,4-bis(aminomethyl)cyclohexane, m-xylylenediamine, p-xylylenediamine, polyoxypropylenediamines, polyamidoamines and aminoplast resins formed by the reaction of ureas and melamines with aldehydes.

Commercially available hardeners include Epi-cure 8535, 8536, 8537, 8290 and 8292 curing agents provided by Hexion; Anquamine 401 and Epilink 381 curing agent provided by Air Products; Beckopox EH659W, EH623W and VEH2133W curing agents provided by Allnex; and Epotuf 37-680 and 37-681 curing agents provided by Reichhold.

Part B can optionally include other ingredients such as water, solvent, defoamer and thickener, which are also listed in Part A.

Part A and Part B are mixed together and then the paint is waiting for application. The ratio of Part A with Part B in the coating composition is 90:1 to 2:1, preferably 15:1 to 4:1 by weight.

The solid content of the coating composition is preferably from 20 to 70%, more preferably from 30 to 65% by weight, and most preferably from 40% to 60% by weight.

EXAMPLES

I. Raw Materials

Raw materials used in the examples are listed in Table 1.

TABLE 1

Raw materials

A) Monomers

| Abbreviation | Chemical nature | Available from |
| --- | --- | --- |
| BMA | butyl methacrylate | Evonik Industry |
| MAA | methacrylic acid | Evonik Industry |
| PEM (QM-1326AP) | phosphoethyl methacrylate | The Dow Chemical Company |
| AMPS | 2-acrylamido-2-methylpropane sulphonic acid | Lubrizol |
| HPA | hydroxypropyl acrylate | The Dow Chemical Company |
| AA | acrylic acid | Evonik Industry |
| EA | ethyl acrylate | Evonik Industry |
| EHA | 2-ethylhexyl acrylate | Evonik Industry |

B) Commercially available materials

| Material | Function | Supplier |
| --- | --- | --- |
| 3-methylmercaptopropanol (MMP) | chain transfer agent | Sinopharm Chemical Reagent Co., Ltd. |
| mercaptoethanol | chain transfer agent | Sigma-Aldrich |
| n-dodecyl mercaptan | chain transfer agent | Sinopharm Chemical Reagent Co., Ltd. |
| OROTAN ™ 731A | Dispersant | The Dow Chemical Company |
| Bentone LT | Thickener | Elementis |
| BYK-024 | Defoamer | BYK Company |
| Tiona 706 | Pigment | DuPont Company |
| Nubirox 106 | Extender | Nubiola |
| Talc | Extender | Shandong Huasheng Fine Chemical |
| CaCO$_3$ 700 | Extender | Guangfu Building Materials Group (China) |
| MAINCOTE ™ AEH-20 | epoxy acrylic imbibed dispersion | The Dow Chemical Company |
| OUDRASPERSE ™ WB-6001 | epoxy binder | OLIN |
| DOW CORNING ™ Z6040 | adhesion promoter | Dow Corning |

TABLE 1-continued

| Raw materials | | |
|---|---|---|
| 15% NaNO$_2$ | inhibitor solution | Sinopharm Chemical |
| DOWANOL ™ DB | Solvent | The Dow Chemical Company |
| DOWANOL ™ DPnB | Solvent | The Dow Chemical Company |
| ACRYSOL ™ RM-8W | Thickener | The Dow Chemical Company |
| ACRYSOL ™ RM-12W | Thickener | The Dow Chemical Company |
| Hardener A 2849W | Hardener | The Dow Chemical Company |

II. Test Process

1. Viscosity Stability

A Stormer viscometer was used to analyze the KU viscosity of a coating composition according to the ASTM (American Society for Testing and Materials) D562 method. After the coating composition was formed, an initial medium shear viscosity and initial KU of the coating composition was analyzed at room temperature, and then the coating composition was placed in an oven at 50° C. for 7 days. The viscosity of the coating composition after storage was analyzed and recorded as the final KU. The difference between the initial KU and the final KU was defined as the heat-age viscosity change, ΔKU. The smaller ΔKU value, the better viscosity stability.

III. Experimental Examples

1. Preparation of Polymeric Dispersants
(Dispersants 1 to 4)

Dispersant 1 (Comparative Example)

A five-liter, five-necked flask equipped with a mechanical stirrer, N$_2$ sweep, thermocouple, and condenser was charged with 750 g of water and 6.35 g of Disponil Fes-32 surfactant supplied by BASF. The solution was heated to 86° C. An initiator, 2.10 g of sodium persulfate (SPS) dissolved in 30 g of water, was added in the solution. Two minutes later, the monomer emulsion comprising 419.36 g of deionized water, 60.87 g of Disponil Fes-32 surfactant, 50.00 g of ethyl acrylate, 600.00 g of 2-ethylhexyl acrylate, 350.00 g of methacrylic acid (MAA), and 19.40 g of methyl 3-mercaptopropionate (MMP) was fed in the solution. Simultaneously, an initiator solution including 1.75 g of SPS and 90.8 g of water was co-fed over a period of 90 minutes while the temperature of the solution was maintained around 86° C., and held for 5 minutes after the end of the feeds. After cooling the solution to 60° C., a chaser system including 7.5 g of ferrous sulfate solution (0.2%, aq) and 1.18 g of tert-butyl hydroperoxide (t-BHP) in 20 g of water, as well as 0.58 g of isoascorbic acid (IAA) in 20 g of water were added in the solution. After holding for 15 minutes, the identical chaser system was charged again. The solution was cooled down to 40° C., and dilution water was added. Finally the resultant was filtered through 325 mesh size screen to afford the copolymer emulsion with total solids of 40%. The weight average molecular weight (Mw) of the Dispersant 1 is ~15000 Daltons. Mw was measured by gel permeation chromatography.

Dispersant 2

A three-liter, five-necked flask equipped with a mechanical stirrer, N$_2$ sweep, thermocouple, and condenser was charged with 420 g of water and 1.95 g of Disponil Fes-993 surfactant. The solution was heated to 86° C. An initiator, 0.65 g of sodium persulfate (SPS) dissolved in 5 g of water, was added in the solution. Two minutes later, the monomer emulsion comprising 130.00 g of deionized water, 18.30 g of Disponil Fes-993 surfactant, 210.00 g of butyl methacrylate (BMA), 15.00 g of methacrylic acid (MAA), 75.00 g of phosphoethyl methacrylate (PEM), and 12.87 g of n-dodecyl mercaptan was fed in the solution. Simultaneously, an initiator solution including 0.53 g of SPS and 60 g of water was co-fed over a period of 90 minutes while the temperature of the solution was maintained around 86° C., and hold for 5 minutes after the end of the feeds. After cooling to 60° C., a chaser system including 4 g of ferrous sulfate solution (0.2%, aq) and 1.18 g of tert-butyl hydroperoxide (t-BHP) in 5 g of water, as well as 0.58 g of isoascorbic acid (IAA) in 5 g of water were added in the solution. After holding for 15 minutes, the identical chaser system was charged again. The solution was cooled down to 40° C., and dilution water was added in the solution. Finally the resultant was filtered through 325 mesh size screen to afford the copolymer emulsion with total solids of 30%. Mw of the Dispersant 2 is ~10,900 Daltons.

Dispersant 3

A three-liter, five-necked flask equipped with a mechanical stirrer, N$_2$ sweep, thermocouple, and condenser was charged with 420 g of water and 1.95 g of Disponil Fes-993 surfactant. The solution was heated to 86° C. An initiator, 0.65 g of sodium persulfate (SPS) dissolved in 5 g of water, was added in the solution. Two minutes later, the monomer emulsion comprising 130.00 g of deionized water, 18.30 g of Disponil Fes-993 surfactant, 225.00 g of butyl methacrylate (BMA), 75.00 g of phosphoethyl methacrylate (PEM), and 12.87 g of n-dodecyl mercaptan, was fed in the solution. Simultaneously, an initiator solution including 0.53 g of SPS and 60 g of water was co-fed over a period of 90 minutes while the temperature of the solution was maintained around 86° C., and hold for 5 minutes after the end of the feeds. After cooling to 60° C., a chaser system including 4 g of ferrous sulfate solution (0.2%, aq) and 1.18 g of tert-butyl hydroperoxide (t-BHP) in 5 g of water, as well as 0.58 g of isoascorbic acid (IAA) in 5 g of water were added in the solution. After holding for 15 minutes, the identical chaser system was charged again. The solution was cooled down to 40° C., and dilution water was added. Finally the resultant was filtered through 325 mesh size screen to afford the copolymer emulsion with total solids of 30%.

Dispersants 2 and 3 could also be synthesized through solvent solution polymerization. This process consists of a solvent gradual addition thermal polymerization in the presence of 2-mercaptoethanol and t-butylhydroperoxide in propylene glycol. Mw of the Dispersant 3 is ~11000 Daltons.

Dispersant 4

A three neck flask equipped with a condenser, a magnetic stirring bar, and a thermocouple was charged with 600 g of distilled water, 252 g of 2-acrylamido-2-methylpropane sulphonic acid (AMPS), 142 g of hydroxypropyl acylate (HPA), 6 g of acrylic acid (AA), 16 g of mercaptoethanol and 4 g of initiator were added to the flask and dissolved in water. The reaction mixture was heated to 65° C. in an oil bath and the heating source was removed. The reaction was allowed to heat via exotherm. After the exotherm, the reaction was heated to 80° C. for 1.5 hours. The initiator was added and the reaction was heated to 85° C. for 30 minutes. The reaction was then cooled to room temperature, and the pH was adjusted to neutral by the addition of NaOH solution. Mw of the Dispersant 4 is ~6000 Daltons.

2. Preparation of Coating Compositions

The two-component (2k) formulation using the imbibed dispersion is listed in Table 2. Part A was formulated by grinding the pigments and extenders with the polymeric dispersant under the speed of 1500 RPM. After 20-30 minutes, MAINCOTE™ AEH-20 was added, along with DOW CORNING™ Z6040, inhibitor solution, solvent, thickener and water to tune the viscosity of the paint. Part B was the hardener. Before application of the formulation to substrate, Part A and Part B were stored independently. Stormer viscosity of Part A before and after heat-aged storage was measured.

The two-component (2k) formulation using the aqueous epoxy dispersion is listed in Table 3 and the process is similar to that above.

TABLE 2

Formulation of 2K Waterborne using Acrylic/Epoxy imbibed Dispersion

Part A (epoxy/acrylic hybrid dispersion)
Grind (g)

| | |
|---|---|
| Water | 12.00 |
| dispersant | Refer to Table 4 |
| Bentone LT | 0.10 |
| BYK-024 | 0.22 |
| Tiona 706 | 4.00 |
| Nubirox 106 | 3.00 |
| Talc 800 | 12.73 |
| CaCO3 700 | 13.11 |

TABLE 2-continued

Formulation of 2K Waterborne using Acrylic/Epoxy imbibed Dispersion

Let-down

| | |
|---|---|
| MAINCOTE AEH-20 | 43.68 |
| DOW CORNING Z6040 | 0.50 |
| Inhibitor solution 15% | 0.44 |
| DOWANOL DB | 0.56 |
| DOWANOL DPnB | 0.60 |
| ACRYSOLTM RM-12W | 0.30 |
| ACRYSOLTM RM-8W | Refer to Table 4 |
| Water | Remain |
| Total | 96.25 |

Part B (hardener)

| | |
|---|---|
| Hardener A 2849W | 3.75 |

TABLE 3

Formulation of 2K Waterborne Epoxy Dispersion

Part A (epoxy dispersion)

Grind (g)

| | |
|---|---|
| Water | 12.00 |
| dispersant | Refer to Table 5 |
| Bentone LT | 0.10 |
| BYK-024 | 0.22 |
| Tiona 706 | 4.00 |
| Nubirox 106 | 3.00 |
| Talc 800 | 12.73 |
| CaCO3 700 | 13.11 |

Let-down

| | |
|---|---|
| OUDRASPERSE ™ WB-6001 | 38.22 |
| DOW CORNING Z6040 | 0.50 |
| Inhibitor solution 15% | 0.44 |
| DOWANOL DB | 0.56 |
| DOWANOL DPnB | 0.60 |
| ACRYSOL ™ RM-12W | 0.30 |
| ACRYSOL ™ RM-8W | Refer to Table 5 |
| Water | Remain |
| Total | 96.25 |

Part B (hardener side)

| | |
|---|---|
| Hardener A 2849W | 3.75 |

3. Results

TABLE 4

Part A Formulation & Properties for Acrylic/Epoxy Hybrid Dispersion

| Part A ID | Comparative Example 1 | Comparative Example 2 | Inventive Example 1 | Inventive Example 2 | Inventive Example 3 |
|---|---|---|---|---|---|
| Dispersant package | OROTAN ™ 731A | Dispersant 1 | Dispersant 2 | Dispersant 3 | Dispersant 4 |
| Dispersant wet weight (g) | 1.34 | 1.69 | 1.14 | 1.14 | 0.96 |
| RM-8w (g) | 0.22 | 0.42 | 0.22 | 0.22 | 0.34 |
| Initial KU | 84 | 82.3 | 82 | 82 | 86 |
| 24 H KU | 97 | 86.8 | 85 | 83 | 92 |
| KU, RT 7 d | 102 | 89.7 | 88.4 | 86 | 90 |
| In-can appearance, RT 7 d | ok | ok | ok | ok | ok |
| KU, 50 C. HA 7 d | — | 110.2 | 97.6 | 92 | 94 |
| In-can appearance, 50 C. HA 7 d | coagulation | Ok, post-thickened | ok | Ok | Ok |

For the paint with MAINCOTE™ AEH-20, Comparative Example 1 is a conventional acrylic copolymer dispersant OROTAN™ 731A. The delta KU after 24 hours paint making is very high (+13 units). After 7 ays heat-aged storage (HA), the paint coagulated, which indicates the poor stability of paint due to the epoxy/acrylic acid reaction. Comparative Example 2 is another acrylic copolymer dispersant with 35% MAA in the composition. The delta KU after 24 hours paint making is acceptable (4.5 units) but the delta KU after HA 7 days would also too high to be acceptable (27.9 units). By comparison, both of sulfonic acid containing dispersant (Dispersant 4, Inventive Example 3) and phosphate dispersants (Dispersants 2 and 3, Inventive Examples 1 and 2) show very good stability even after 7 ays HA.

TABLE 5

Part A Formulation & Properties for Epoxy Dispersion

| Part A ID | Comparative example-3 | Inventive example-4 |
| --- | --- | --- |
| Dispersant package | OROTAN ™ 731A | Dispersant 4 |
| Dispersant wet weight (g) | 1.34 | 0.84 |
| RM-8w (g) | 2.04 | 1.68 |
| Initial KU | 81 | 80 |
| 24 H KU | 82 | 78 |
| KU, RT 7 d | 90 | 76 |
| In-can appearance, RT 7 d | precipitated | ok |
| KU, 50 C. HA 7 d | 107 | 82 |
| In-can appearance, 50 C. HA 7 d | precipitated | ok |

For the paint with OUDRASPERSE™ WB-6001, Comparative example-3 is conventional acrylic copolymer dispersant OROTAN™ 731A. The paint stability was poor by using the acrylic dispersant. The paint precipitated and the delta KU after 7 days HA was as high as 26 units. Inventive Example 4 was made using Dispersant 3. The stability of paint was very good and delta KU after HA is very low (2 units).

What is claimed is:

1. A coating composition comprising components (A) and (B):
   (A) based on the total dry weight of the component (A),
      (a) from 10 to 75% of a waterborne epoxy present in a dispersion,
      (b) from 0.01 to 5% of a polymeric dispersant wherein the polymeric dispersant is present in solution, and
      (c) from 20 to 85% of inorganic particles, and
   (B) a curing agent,
   in which a weight ratio of the component (A) to the component (B) is 90:1 to 2:1, and the polymeric dispersant in the solution is a polymer formed from a monomer composition comprising a monomer containing an anti-agglomerating functional group,
   wherein the monomer containing the anti-agglomerating functional group is selected from the group consisting of phosphoethyl methacrylate, sodium styrene sulfonate, and acrylamide-methyl-propane sulfonate.

2. The coating composition of claim 1, wherein the monomer composition comprises: i) the monomer containing an anti-agglomerating functional group, ii) optionally an α,β-ethylenically unsaturated carboxylic acid monomer and iii) an α,β-ethylenically unsaturated nonionic monomer.

3. The coating composition of claim 1, wherein the monomer containing the anti-agglomerating functional group is selected from the group consisting of phosphoethyl methacrylate and sodium styrene sulfonate.

4. The coating composition of claim 2, wherein the monomer composition comprises, based on the dry weight of the polymeric dispersant:
   i) from 5 to 80% by weight of the monomer containing the anti-agglomerating functional group, ii) from 0 to 10% by weight of the α,β-ethylenically unsaturated carboxylic acid monomer and iii) from 10 to 95% by weight of the α,β-ethylenically unsaturated nonionic monomer.

5. The coating composition of claim 1, wherein the polymeric dispersant has a weight average molecular weight of from 500 to 50,000 Daltons.

6. The coating composition of claim 1, wherein the inorganic particles are dispersed in the component (A).

7. The coating composition of claim 1, wherein a solid content of the coating composition is from 40% to 60% by weight.

* * * * *